3,515,683
CERIUM FAUJASITE CATALYST
William H. Flank, Broomall, and James E. McEvoy,
 Springfield, Pa., and George Alexander Mills, Bethesda,
 Md., assignors to Air Products and Chemicals, Inc.,
 Philadelphia, Pa., a corporation of Delaware
No Drawing. Continuation-in-part of application Ser. No.
 540,201, Apr. 5, 1966. This application Jan. 28, 1969,
 Ser. No. 794,792
Int. Cl. B01j *11/40;* C01b *33/28*
U.S. Cl. 252—455   3 Claims

ABSTRACT OF THE DISCLOSURE

Kaolin is calcined at a temperature at which an exotherm occurs to prepare a reactive kaolin. A composition comprising sodium faujasite in an amorphous aluminosilicate matrix is prepared by aging a slurry of such reactive kaolin in aqueous alkali. Particular advantages arise from the enhanced thermal stability of the faujasite by reason of the amorphous aluminosilicate matrix in which it is distributed. The sodium faujasite is subjected to ion-exchange with a basic nitrogen compound until the faujasite is substantially free from ion-exchangeable sodium. The ammonium faujasite is treated with a controlled amount of an aqueous solution of rare earth salts to prepare a composition comprising both ammonium faujasite and rare earth faujasite. Catalyst particles such as fluidizable particles or spheroids suitable for a moving bed are prepared either before or after such ion-exchange treatment. The cracking catalyst particles are subjected to a gas stream comprising steam at a temperature removing substantially all of the basic nitrogen compound to provide catalyst particles featuring both hydrogen faujasite and rare earth faujasite. Such particles have outstanding thermal stability and an attractive combination of activity, selectivity, and stability for the conversion of gas oil to gasoline.

CROSS-REFERENCE

This is a continuation-in-part of our applications Ser. No. 540,201 filed Apr. 5, 1966 and Ser. No. 574,306 filed Aug. 23, 1966 both now abandoned, and Ser. No. 628,518 filed Apr. 5, 1967, and the entire disclosure of each of said ancestor cases is deemed here reiterated. Reference is also made to Ser. No. 781,951 filed Dec. 6, 1968, which constitutes substantially a merger of said Ser. No. 540,201 and Ser. No. 574,306.

BACKGROUND OF THE INVENTION

In early days of catalytic technology, it was learned that the relationships amongst diffusion characteristics, sorption characteristics, and catalytic properties were such that crystalline zeolites were preferred for catalyst supports for reactions for which they were suitable, as exemplified by Mittasch 1,215,032, Mittasch 1,215,396, and Lamb 1,813,174.

The advantages of crystallinity over the amorphous state were recognized in catalyst research, Milliken 2,688,002 exemplifying an effort to increase the crystalline character of a cracking catalyst. The use of rare earth components in cracking catalyst has been described in patent literature over a period of many years, and the merely technical advantages were adequately recognized. Bond et al. 2,449,050 describes a cracking catalyst featuring rare earth cations. However, from the economic standpoint, the marginal superiority attributed to the rare earth cations was insufficient to merit increased manufacturing cost in some amorphous catalysts.

At an early date, it was learned that amorphous ammonium zeolite could be transformed into a partially decationized hydrogen zeolite having excellent acid activity for reactions such as the cracking of hydrocarbons. It was known that a very few hydrogen zeolites could be prepared by acid washing of a sodium zeolite, but that the standard route was from the amorphous or crystalline sodium zeolite to the ammonium zeolite followed by thermal deammoniation to the amorphous or crystalline hydrogen zeolite. The ion-exchange capacity of a hydrogen zeolite is always less than that of the ammonium zeolite from which it is derived, and such loss of ion-exchange capacity is sometimes called decationization. The small pore properties of high purity crystalline hydrogen zeolites were recognizably unsuitable for the cracking of gas oil because sorption studies on crystalline zeolites had consistently shown that the pore size excluded sorption of aromatic hydrocarbon molecules.

In 1953, Milton and Breck made the remarkable discovery that natural faujasite has large pores capable of sorbing benzene as disclosed in 2,988,503 and Belgian 534,193. In the same year Milton filed an application relating to the synthetic faujasite known as Zeolite X, as disclosed in 2,882,244, Belgian 534,425, and French 1,117,756.

Faujasite is a low density zeolite which can be viewed as an aggregation of sodalite cages comprising ions of oxygen, aluminum and silicon, the sodalite cages being interconnected by hexagonal bridges to provide a cubic crystal lattice. For some purposes, faujasite can be classified among a group including several other varieties of crystalline zeolites comprising more closely packed sodalite cages.

A great variety of crystalline zeolites, some having a structure resembling that of a natural zeolite, and some having unidentified structures, were synthesized by aging of aqueous aluminosiliceous compositions having alkalinity attributable to LiOH, KOH, NaOH, and/or mixtures thereof. Synthesis of crystalline zeolites was relatively simple compared with the amount of work involved in adequate identification of the crystalline species. Unless the researcher recognized the suitability of the product for a commercially significant end-use, the yields, compositions, etc. of synthetic zeolites were sometimes not reported, even when the range of experimental conditions was reported. In connection with the manufacture of ultramarine blue, Kumins et al. 2,544,695 demonstrated that for commercial production of some types of crystalline zeolite, calcined kaolin, possibly supplemented by additional reactive silica such as diatomaceous earth, was the preferred starting material. Supplemental evidence indicates that during the research by Kumins et al. there were X-ray studies of the synthetic zeolites. However, the Kumins et al. patent did not mention any recognition that synthetic faujasite might have resulted from compositions and procedures such as suggested for zeolite synthesis therein. A series of patents including Howell et al. 3,114,603 and Haden et al. 3,338,672 describe some of the earlier work involving faujasite synthesis from calcined kaolin and/or mixtures of calcined kaolin and additional reactive silica. Procedures for making cracking catalyst from calcined kaolin by procedures similar to those of Kumins et al. are described in Example IIIb of Mills 2,584,148.

Milton 2,882,244, the application for which was the earliest acknowledgement of faujasite synthesis, described the rare ion-exchanged form of Zeolite X, which was ultimately found to possess outstanding stability to thermal degradation. Said Milton application also described the ammonium form of Zeolite X, which obviously possessed catalytic cracking activity, but which obviously was much more expensive than the amorphous ammonium zeolites employed for cracking catalyst manufacture in 1953. Although the hydrogen (and therefore decationized) Zeolite X was sufficiently stable at cracking temperatures, at least a part of the hydrogen X structure decomposed into an amorphous aluminosilicate of reduced cracking activity when subjected to steam (always present in regeneration gases) at the temperatures conventionally employed for regeneration of cracking catalyst. In order to benefit from the activity and selectivity advantage of hydrogen faujasite as a cracking catalyst, it was necessary to provide lower regeneration temperatures and/or enhanced stability characteristics for the faujasite. Consistent with the teachings of prior art such as the 1953 Milton application, petroleum technologists prepared the product from the ion-exchange of sodium X with a solution of cerium salt, conveniently called cerium X. Chemists have been quite inconsistent about the terminology for rare earth compounds, sometimes designating any mixture comprising cerium as if it were a technical grade of a cerium compound, and sometimes designating such a mixture as a rare earth compound. Cerium X had acceptable thermal stability as did the forms of Zeolite X having some hydrogen cations and rare earth cations. Cracking catalysts containing a matrix and a minor amount of such mixed hydrogen (derived from ammonium) and rare earth derivatives of Zeolite X proved sufficiently superior in laboratory tests that ultimately funds were authorized for industrial production of fluidizable particles of such catalyst. Such commercialization of a new cracking catalyst was quite remarkable in view of the history of failures and poor profitability of a series of novel, apparently superior cracking catalysts during previous decades. After the commercial availability of the rare earth faujasite type of fluidized cracking catalyst, its advantages proved to be sufficiently great that the rare earth faujasite type of fluidized cracking catalyst represented one of the most rapidly adopted innovations in the history of the processing of petroleum.

Early attempts at use of 100% hydrogen faujasite had been discouraging to cracking technologists and led to significant emphasis upon the desirability of a range from about 5% to about 25% for the concentration of the faujasite component. Measurement of the faujasite is generally both easier and more accurate in a precursor featuring sodium faujasite than in the products resulting from subsequent manufacturing steps. Early cracking catalysts featuring faujasite were intended for use in conventional cracking units, in which the coke burning capacity and other features were significant limitations.

In the fluidizable cracking catalysts which dominated commercialization of this branch of the industry most of the ion-exchange capacity of the faujasite content of the calcined catalyst was stabilizzed by rare earth cation. However, a significant portion of the granular (as distinguished from fluidizable) catalyst sold by catalyst mancalcined catalyst was stabilized by rare earth cation. and was of the hydrogen faujasite type, derived from a calcined kaolin-containing precursor. In a granular catalyst particle featuring amorphous aluminosilicate residue derived from kaolin, the hydrogen faujasite has both steam stability and activity properties permitting profitable cracking operations without the higher manufacturing costs attributable to inclusion of rare earth in the catalyst. Kaolin-derived hydrogen faujasite meets commercial stability requirements without need for rare earth when the sodium faujasite concentration in the precursor is less than about 25%.

SUMMARY OF THE INVENTION

A composition featuring sodium faujasite in an amorphous aluminosilicate matrix is prepared by aging a slurry of reactive kaolin in aqueous alkali. The reactive kaolin is prepared by calcination of kaolin at a temperature at which an exotherm occurs. Exhaustive ion-exchange with a basic nitrogen cation such as ammonium cation provides an ammonium faujasite substantially free from ion-exchangeable sodium ion. At some stage, catalyst particles, such as spheroids for a gravitating bed or microspheroids for a fluidized bed, are prepared from a composition featuring the kaolin-derived faujasite. The preparation of catalyst particles comprising ammonium faujasite in a matrix featuring the amorphous aluminosilicate residue derived from reactive kaolin is set forth in the previously identified ancestor applications.

An aqueous acidic solution of a rare earth salt, sometimes conveniently designated as a technical grade of a cerium salt, is employed for the treatment of the ammonium faujasite-containing material to prepare a composition comprising both cerium faujasite and ammonium faujasite. Treatment of catalyst particles comprising such mixture of cerium faujasite and ammonium faujasite at an elevated temperature in the presence of steam provides cracking catalyst particles featuring both hydrogen faujasite and cerium faujasite in the amorphous aluminosilicate residue derived from reactive kaolin. The properties of such cracking catalyst particles are remarkably superior to conventional cracking catalysts, particularly as regards stability, that is, withstanding steam at elevated temperatures for prolonged periods, as in accelerated aging tests. Moreover, such cracking catalysts are so active and selective that they can be employed at higher space rates than conventional catalysts. The outstanding properties are believed to be attributable to an unexpected mutual enhancement of the effects of the amorphous aluminosilicate residue from reactive kaolin and the cerium faujasite whereby the composite has outstanding thermal stability as well as attractive activity and selectivity.

Example 1

A catalytic grade of kaolin was calcined at about 1000° C. to provide a reactive kaolin having less than 8% of the exotherm which would be exhibited by raw kaolin or meta kaolin in a test of the kaolin exotherm in differential thermal analysis apparatus. A batter of 3 parts of such calcined kaolin in 4 parts of aqueous sodium hydroxide was prepared. The mixing of the initial batter was conducted with a Cowles dissolver rotated at 750 r.p.m. during a 10 minute period. The sodium hydroxide solution was prepared to consist of 16.7 parts of sodium hydroxide or about 4.92 normal sodium hydroxide solution having a specific gravity of about 1.1824. The batter had proportions corresponding to 4.5 grams of reactive calcined kaolin to 5 grams of water to 1 gram of sodium hydroxide. This batter was transferred to an oven maintained at 100° C. and maintained in the oven for 48 hours. The prolonged aging led to a product containing about 75% sodium faujasite.

During the oven treatment, the batter was transformed into a cake consisting predominantly of sodium faujasite mixed with a minor amount of an amorphous mixture of oxides of sodium, silicon, and aluminum, conveniently called amorphous aluminosilicates. The cake was subjected to grinding to prepare an aqueous dispersion of small particles. By spray-drying of an aqueous dispersion featuring the small particles derived from alkaline aging of reactive kaolin, particles of the fluidizable size range were prepared. In some operations, a binder such as sodium silicate was included in the composition subjected to spray-drying. The spray-dried particles were subjected to a hot solution of ammonium nitrate having a concentration of about 20% ammonium nitrate. About 2 liters of ammonium nitrate solution per kilogram of solids were employed for each stage of ion-exchange of the spray-dried fluidizable particles. The hot ammonium nitrate treatment was repeated about a dozen times, each treatment being for about ½ hour, in order to transform the fluidizable solids to ammonium faujasite in an aluminosilicate matrix. Such product was substantially free from ion-exchangeable sodium.

The concentration of faujasite in the precursor was measured, desirably at the sodium faujasite stage, or alternatively at the ammonium faujasite stage, so that it was known that the ammonium faujasite particles consisted predominantly of ammonium faujasite within a minor amount of amorphous aluminosilicate matrix.

The ammonium faujasite particles were treated with an aqueous solution of 10% cerium nitrate (technical grade), the term cerium being used to designate generically the mixture of rare earth oxides. The quantity of rare earth nitrate employed was insufficient to correspond with the complete ion-exchange capacity of the ammonium faujasite, and to be within the range from about 5 to about 33% of the ion-exchange capacity of the ammonium faujasite particles.

The fluidizable particles were deammoniated at a temperature of about 500° C. in the presence of steam to prepare cracking catalyst particles having an advantageous combination of activity, selectivity, and stability. In the early period of development of cracking catalyst, tests were sometimes conducted by heating in air at a selected temperature for a selected period. It was found that equivalent degradation of the catalyst could generally be achieved by accelerated aging treatment in steam at a lower temperature. Thus, eventually, thermal stability measurements indicated the ability to withstand hot steam instead of the initial significance of withstanding hot air.

After accelerated aging treatment in hot steam, the fluidizable cracking catalyst particles had an advantageous combination of activity, selectivity, and stability. Performance of the catalyst indicated superiority indicating an incremental profitability of the cracking operation using the improved catalyst of the present invention which was many times greater than the incremental cost of production of the improved catalyst.

Examples 2–4

Following the general procedure of Example 1, varying amounts of sodium silicate were employed in the composition to enhance the attrition-resistance of a series of fluidizable catalyst samples. The catalyst containing 20% silica had superior attrition-resistance. Most accelerated aging tests are conducted in steam at temperatures such as 700°, 730°, or 760° C. but recently a high-severity test at 815° C. has been devised for catalyst undergoing only mild deactivation at the conventional severity of accelerated aging. The catalyst of each of Examples 2–4 was heated in 100% steam for 4 hours at 815° C. as an accelerated aging treatment and then cooled. X-ray diffraction measurements of the thus-aged catalyst indicated that much of the initially formed faujasite crystallinity had been destroyed by the severity of the artificial aging. After such accelerated aging treatment, properties of the steamed catalyst included:

| Ex. | Percent Added $SiO_2$ | Percent $Na_2O$ | Percent Ce |
| --- | --- | --- | --- |
| 2 | 0 | 0.33 | 7.41 |
| 3 | 10 | 0.43 | 5.94 |
| 4 | 20 | 0.30 | 4.80 |

Such steamed catalyst samples were subjected to CAT–D evaluation as described by Harriz in "Petroleum Processing" of October 1966. When tested at a space rate of 1 and a catalyst to oil ratio of 4:1, the results were:

| Ex. | Vol. percent gaso. | Wt. percent Conv. | Coke | Gas | Selectivity | Gas gravity |
| --- | --- | --- | --- | --- | --- | --- |
| 2 | 62.7 | 80.2 | 4.3 | 22.9 | 66.1 | 1.57 |
| 3 | 54.8 | 84.5 | 6.8 | 31.4 | 54.8 | 1.57 |
| 4 | 60.1 | 80.5 | 4.3 | 25.4 | 63.1 | 1.60 |

The outstandingly high conversion indicated that the catalysts would have effectiveness at a higher space rate; hence, modified CAT–D tests were conducted at a catalyst to oil ratio of 2 and a space rate of 6 v./v./hr.

| Ex. | Vol. percent gaso. | Wt. T. Conv. | Coke | Gas | Selectivity | Gas gravity |
| --- | --- | --- | --- | --- | --- | --- |
| 2 | 65.4 | 66.9 | 1.6 | 10.0 | 82.1 | 1.59 |
| 3 | 69.4 | 73.4 | 2.2 | 12.6 | 79.8 | 1.63 |
| 4 | 67.2 | 68.3 | 1.4 | 10.1 | 83.2 | 1.64 |

Such performance of a catalyst at such a high space rate after such severe accelerated aging at 815° C. was deemed outstanding evidence that each of the three catalysts were remarkably superior as regards activity, selectivity, and stability.

Because it was known that the silica to alumina unit mol ratio was 3.5 and that the sodium faujasite content of the aged cake was 70%, it was feasible to calculate certain relationships. The formula weight of the theoretical hydrogen faujasite was 330 and the formula weight of the theoretical decationized faujasite was 312, and the hydrated sodium faujasite had a formula weight of 554, permitting a calculation of 57% decationized faujasite and 43% aluminosilicate matrix in the freshly prepared catalyst for Example 2. Inasmuch as the catalyst of Example 2 had 7.41% cerium cation or 8.68% $Ce_2O_3$, much less than the 28.4% $Ce_2O_3$ of a completely exchanged material, it was feasible to calculate that less than 31% of the ammonium faujasite was converted to the rare earth faujasite in the ion-exchange step in preparing the catalyst of Example 2.

Certain advantages are gained if the cracking catalysts are prepared so that the cerium exchange is of less than half of the ammonium faujasite. Cerium salts and rare earth salts are very costly. The raw material cost per ton for the rare earth salts is many times the price at which cerium-containing cracking catalysts are sold. The discovery that in a cracking catalyst having faujasite distributed throughout the residue from kaolin, superior activity and stability are achieved from a precursor having both ammonium faujasite and rare earth faujasite, constitutes an unobvious and significant forward step in cracking catalyst technology.

Example 5

A pilot plant batch of about 75 kg. of catalyst was prepared. Two batches of sodium faujasite in a sodium aluminosilicate matrix were mixed with sufficient aqueous sodium silicate solution to provide a ratio of about 3 parts of added silica matrix per 7 parts of aluminosilicate product. Each batch of the sodium aluminosilicate contained about 67% sodium faujasite having a silica to alumina unit mol ratio of about 4.3, and was derived by steps comprising hot aging (100° C.) of a slurry having 4.5 parts of de-exothermed kaolin, 5 parts of water, and 1 part by weight of sodium hydroxide. The crushed aged cake and aqueous sodium silicate solution were subjected to milling in a Kady mill for about 2 hours to prepare an aqueous slurry in which most particles were quite small. The slurry was agitated while fed to a series of batches for spray-drying, each conducted at 75 p.s.i.g. nozzle pressure at 430° C. inlet and 120° C. outlet temperature. The batches were combined, and the microspheres were dispersed in a quantity of 0.8 Normal sulfuric acid providing a final pH of about 7.6. The acid-treated particles were water-washed and then treated with 2.7 N (20% by weight) ammonium nitrate at 95° C. for 30 minutes in a 500 gallon kettle in which the slurry of particles was stirred to promote ion-exchange. The steps of hot water washing and hot ammonium ion-exchange were repeated for a total of 6 times. The ammonium-exchanged fluidizable particles, although containing measurable residual sodium oxide, were from a commercial standpoint, particles of matrix containing ammonium faujasite without significant amounts (i.e., less than about 10% of the ion-exchange capacity) of ion-exchangeable alkali ions.

The thus-prepared ammonium faujasite particles were subjected to a single stage of exchange with an aqueous solution of rare earth chlorides at ambient temperature for 30 minutes. The solution was about 1 Normal in rare earth trichloride, and was adapted to form about 5.3% rare earth oxide in the finished catalyst. The distribution of the oxides in the rare earth trichloride hexahydrate corresponded to about 21.4% $CeO_2$, 10.7% $La_2O_3$, 7.6% $Nd_2O_3$ and 5.2% of a mixture of other rare earths such as $Pr_6O_{11}$, $Sm_2O_3$, $Y_2O_3$ and the like. The cerium ion-exchanged material was water washed 3 times for 30 minutes at 95° C. The washed product was dried at 120° C. for 16 hours. The thus-prepared particles contained 15.8% water. The dehydrated catalyst contained 5.28% rare earth cation, 0.15% sodium oxide, 0.06% chloride, 0.08% nitrate, and the balance was aluminosilicate.

The faujasite content and the silica to alumina mol ratio in the faujasite are most conveniently and accurately measured when the precursor is in sodium faujasite form and prior to admixture with sodium silicate. For purposes of very approximate calculations, the final catalyst can be deemed to be the summation of the quantity of added silica (from the sodium silicate), rare earth oxides (from final ion-exchange with rare earth trichloride) and aluminosilicate (from calcined kaolin). Thus the sodium hydroxide, water, sulfuric acid, ammonium nitrate, etc. employed during intermediate stages are not present in significant amounts in the catalyst as used. By such calculations, the catalyst containing 5.28% rare earth oxides can be deemed to have as rare earth faujasite approximately 25% of the ion-exchange capacity of a faujasite-in-matrix catalyst derived from the addition of sodium silicate imparting about 30% silica. The product derived from aging a 4.5:5:1 mixture of de-exothermed kaolin, water, and sodium hydroxide had about 67% faujasite having a silica to alumina unit mol ratio of about 4.3. It is convenient to treat the catalyst containing about 5.28% rare earth as representing from about 17% to about 23% of the ion-exchange capacity of the faujasite. Similarly, the catalyst can be deemed to be about 44% faujasite type of crystalline aluminosilicate, of which about 35% is hydrogen faujasite or derivatives thereof, and 8.7% is associated with the cations of the 5.28% rare earth content of the catalyst. Although X-ray diffraction measurements on the final catalyst provide data useful for manufacturing control, such measurements involve difficulties not encountered in measuring the faujasite content of the precursor prior to milling.

After 6 hours in 100% steam at about 760° C. the pore volume as measured by the use of para-xylene was 0.43 ml./g.

The bulk density, after 2 hours at 205° C., and 1 hour at 590° C. was 0.693 g./ml. The particle size distribution showed 47.5% over 149 microns, 32.6% in the 90–149 micron range, and 19.9% in the 20–90 micron range. Attrition resistance of the fluidizable particles in the standard air jet test showed that attrition losses were about 0.29 weight percent per hour during testing from the fifth through 22nd hours.

A sample of the catalyst was subjected to an accelerated aging test of treatment for 4 hours in 100% steam at 820° C., a test generally considered more severe than several months' usage of the catalyst in a refinery. When evaluated by the CAT-D type procedure, the catalyst performance data were:

| LHSV | Vol. percent gaso. | Wt. percent Coke | Gas | Conv. | Selec. | Gas grav. |
| --- | --- | --- | --- | --- | --- | --- |
| 1 | 56.8 | 6.0 | 28.0 | 82.0 | 58.5 | 1.50 |
| 6 | 69.0 | 2.4 | 12.2 | 72.9 | 80 | 1.62 |

Such results are persuasive evidence that the catalyst, after such accelerated aging treatment, was superior to catalysts of the type commercially available heretofore, after such accelerated aging treatment.

Examples 6–10

Kaolin was calcined at about 1010° C. to provide a reactive kaolin having an exotherm on Differential Thermal Analysis of about 1% of that of meta kaolin. A slurry of such reactive kaolin in 16.7% sodium hydroxide solution (clay; water; NaOH weight ratios 4.5:5:1) was aged to produce a cake comprising a major amount of sodium faujasite in a lesser amount of amorphous aluminosilicate. The product was ball milled, mixed with aqueous sodium silicate, spray dried, acid hardened, and elutriated to recover the fraction having relatively large fluidizable size. The amount of silica added as sodium silicate was approximately 50% of the final catalyst. The particles were exhaustively exchanged with hot aqueous ammonium nitrate solution and then water rinsed. The ammonium faujasite particles were subjected to approximately 20% ion-exchange with a technical grade of cerium chloride, rinsed, and heat treated at 700° C. to provide active cracking catalyst particles comprising both hydrogen faujasite and cerium faujasite in a matrix comprising an amorphous aluminosilicate residue from the calcined kaolin.

The active cracking catalyst was partially deactivated by an accelerated aging treatment deemed more severe than six months of refinery use, and intended to simulate the lowest probable activity of equilibrium catalyst at conditions at which catalyst replacement rates were influenced primarily by attrition losses and only secondarily by deactivation rates. Such accelerated aging treatment was for four hours in 100% steam at 815° C. (1500° F.).

After such accelerated aging, the surface area of the catalyst was about 130 m.²/g., and its bulk density was 077 g./cc. Such aged catalyst was employed in a laboratory scale fluidized cracking reactor, obtaining results as indicated in the table.

Data are shown for a control sample labeled "C," closely resembling Example 8, but differing in the use of an equilibrium fluidized catalyst sample taken from a commercial cracker, said sample consisting of approximately 85% brand AC catalyst and 15% brand GD catalyst, each brand containing cerium faujasite. The equilibrium sample had been aged in the cracker and hence did not require an artificial aging treatment. The equilibrium catalyst was dried at 560° C. for 3 hours prior to testing.

TABLE

| Example | 6 | 7 | C | 8 | 9 | 10 |
| --- | --- | --- | --- | --- | --- | --- |
| Temperature: | | | | | | |
| °C | 471 | 477 | 482 | 482 | 499 | 496 |
| °F | 880 | 890 | 900 | 900 | 930 | 925 |
| Feed rate Heavy East Texas Gas Oil, g./hr | 1,000 | 1,500 | 2,000 | 2,000 | 2,000 | 2,000 |
| Weight hourly space velocity | 2 | 3 | 4 | 4 | 4 | 4 |
| Catalyst circulation rate, g./hr | 4,000 | 4,000 | 4,000 | 4,000 | 4,000 | 4,000 |
| Catalyst, wt./oil wt. ratio | 4 | 2.7 | 2 | 2 | 2 | 4 |
| Wt. percent, coke | 2.6 | 1.7 | 0.8 | 1.4 | 1.4 | 2.1 |
| $C_3$ and lighter | 6.1 | 5.3 | 4.1 | 6.4 | 7.1 | 7.2 |
| $C_4$ | 11.0 | 10.9 | 7.7 | 11.5 | 12.4 | 12.9 |
| $C_5$+gasoline | 48.6 | 51.2 | 36.5 | 51.6 | 49.4 | 50.5 |
| Conversion | 68.3 | 69.1 | 49.1 | 70.9 | 70.3 | 72.7 |
| Gasoline selectivity | 71.3 | 72.4 | 72.4 | 73.0 | 70.3 | 69.5 |
| Volume percent gasoline | 56.8 | 59.8 | 41.7 | 60.5 | 58.7 | 59.9 |

Such performance of a cracking catalyst subjected to such accelerated aging was deemed outstanding evidence of an advantageous combination of activity, selectivity, and stability of the catalyst. Moreover, the severely aged catalyst proved markedly superior to a commercial equilibrium catalyst at the test conditions.

Example 11

A catalyst was prepared by a procedure substantially the same as that described in Example 5 to provide a cracking catalyst which was subjected to accelerated aging by treatment for four hours at 1500° F. in 100% steam. The aged catalyst had a surface of about 172 square meters per gram. The aged catalyst was evaluated by the CAT-D test in which the vapors of the gas oil were subjected to the action of the catalyst.

The space rate, expressed as a liquid hourly space velocity, was 6. The weight percent conversion was 62% and the volume percent gasoline yield was 60%. The gas gravity was 1.61. The weight percent of gas was 9.3, and the weight percent of coke was 2.0%.

A pilot plant was built for evaluating cracking catalyst in fluidizable form. In this apparatus, the Heavy East Texas gas oil regularly used in the evaluation of granular catalyst was pre-heated to 700° F. and contacted at near-atmospheric pressure with fluidizable catalyst at 900° F. The fluidizable catalyst was previously elutriated to provide a relatively coarse particle size, most of the fluidizable particles being larger than 50 microns and having an average particle size of about 90 microns. An inert fluidizable material was prepared by spray drying an aqueous solution of colloidal silica. Such inert particles provided an amount of cracking which was substantially the same as would be expected at purely thermal cracking conditions.

The gas oil was cracked over a mixture of 80% inert silica particles and 20% of the cracking catalyst comprising rare earth faujasite and hydrogen faujasite in an aluminosilicate residue from the aging of calcined kaolin to faujasite. There was 61 wt. percent conversion, with the formation of 1 wt. percent coke. The weight percent gasoline was 47.3% and the volume percent was 55.7%.

Using a mixture of 30% of the cracking catalyst and only 70% of the inert silica particles, there was a conversion of 69.7% and the gasoline constituted 61.5% by volume or 51.1% by weight of the products. The coke yield was 1.5 wt. percent. The liquid hourly space velocity was 0.5, and the catalyst to oil weight ratio was 8.

Such data indicate that the cracking catalyst particles are effective even when employed as a minor component in a large amount of inert particles.

Examples 12–15

A series of catalysts were prepared following the procedure of Example 5 but varying the amount of added sodium silicate to achieve the designated amounts of added silica below:

| Example | Added SiO₂, wt. percent | Attrition, wt. percent/hr. |
|---|---|---|
| 12 | 16 | 0.85 |
| 13 | 20 | 0.52 |
| 14 | 30 | 0.16 |
| 15 | 50 | 0.04 |

The catalysts were evaluated after accelerated aging in steam at 815° C. for 4 hours. At a liquid hydrocarbon hourly space rate of 1, the aged catalysts provided interesting performance data, as follows:

| Example | 12 | 13 | 14 | 15 |
|---|---|---|---|---|
| Wt. percent conversion | 80.2 | 79.0 | 71.5 | 77.4 |
| Vol. percent gasoline | 60.2 | 60.0 | 62.2 | 63.3 |
| Wt. percent coke | 3.8 | 4.6 | 3.2 | 3.1 |
| Wt. percent selectivity | 63.5 | 64.2 | 73.6 | 69.1 |

Such data indicated that overcracking occurred. The catalysts were retested at a space rate of 6 to obtain further performance data of interest. A control catalyst prepared generally like Example 12 but without any rare earth component is shown, to indicate the effect of cerium in severely aged catalyst.

| Example | C | 12 | 13 | 14 | 15 |
|---|---|---|---|---|---|
| Wt. percent conversion | 30.1 | 67.4 | 67.5 | 63.6 | 57.2 |
| Vol. percent gasoline | 31.8 | 66.0 | 65.3 | 62.8 | 57.8 |
| Wt. percent coke | 1.2 | 1.8 | 1.7 | 1.8 | 1.7 |
| Wt. percent selectivity | 89.4 | 82.8 | 81.8 | 83.5 | 85.3 |

The catalysts of the invention have surprising superiority over either cerium-containing fluidizable cracking catalysts prepared without the kaolin residue matrix, as shown by the control employing equilibrium commercial catalyst, or the control featuring kaolin-derived cracking catalyst free from cerium, thus establishing a surprising synergistic effect from the combination of kaolin residue matrix and cerium-exchanged faujasite.

Example 16

A catalyst was prepared as described in connection with Example 12, containing silica derived from the added sodium silicate amounting to 16%. Said catalyst contained 4.8% rare earth cation, 0.3% sodium oxide, and had a surface area of 159 m.²/g. after the accelerated aging treatment at 815° C. in steam for 4 hours. Such aged catalyst had a crystallinity measurable by X-ray diffraction corresponding to 15% of that of sodium faujasite using a standard peak intensity comparison method, but its cracking effectiveness was indicative of significantly higher faujasite content, possibly in microcrystallite form transparent to X-ray measurements.

Said catalyst was evaluated in the CAT-D apparatus using a series of temperatures to permit more accurate measurement of the selectivity of the catalyst for cracking gas oil to gasoline. The observations are shown in a table:

| Temp., °F | 700 | 750 | 750 | 800 | 800 | 850 | 850 | 950 |
|---|---|---|---|---|---|---|---|---|
| LHSV | 1 | 1 | 2 | 1 | 6 | 1 | 6 | 6 |
| Cat/oil ratio | 4 | 4 | 2 | 4 | 2 | 4 | 2 | 2 |
| Wt. percent conversion | 52.4 | 66.6 | 51.5 | 75.6 | 53.6 | 77.2 | 59.7 | 68.3 |
| Vol. percent gasoline | 53.3 | 67.2 | 55.6 | 71.7 | 57.0 | 66.7 | 61.1 | 67.2 |
| Wt. percent coke | 6.2 | 6.2 | 2.4 | 6.2 | 2.6 | 5.8 | 2.6 | 1.4 |
| Wt. percent gas | 1.2 | 3.6 | 1.4 | 8.8 | 2.8 | 15.0 | 5.5 | 10.1 |
| Gas grav | 1.14 | 1.35 | 1.26 | 1.54 | 1.47 | 1.57 | 1.53 | 1.64 |
| Wt. percent selectivity | 85.9 | 85.3 | 93.2 | 80.2 | 89.9 | 73.0 | 86.4 | 83.2 |

The superior selectivity and activity of the catalyst after such severe aging indicates that the catalytic sites are numerous and are favorable for the cracking of gas oil to gasoline.

Examples 17–18

Catalysts were prepared following the general pattern of the previous examples, including the use of an accelerated aging treatment at 815° C. for four hours in 100% steam. The initial aging featured the reactive calcined kaolin, but included a modifier imparting a different silica to alumina unit mol ratio. The catalysts were evaluated by the tests resembling the CAT-D procedure at the specified LHSV (liquid hourly space velocity). The observations included:

| Ex. | Bayerite q.s. SiO₂/Al₂O₃ | Perlite q.s. SiO₂/Al₂O₃ | Ce₂O₃ | LHSV | Vol. percent Gaso. | Wt. percent Conv. | Wt. percent Selec. |
|---|---|---|---|---|---|---|---|
| 17x | 1.5 | | None | 1 | 57.6 | 63.4 | 76.0 |
| 17a | 1.5 | | 3.9 | 6 | 64.0 | 64.0 | 84.6 |
| 17b | 1.5 | | 3.9 | 3 | 69.0 | 78.6 | 74.1 |
| 18x | | 2.38 | None | 1 | 57.3 | 60.7 | 79.7 |
| 18a | | 2.38 | 3.71 | 3 | 70.1 | 72.9 | 81.4 |

Such data indicate that the in situ approach toward stabilization can utilize small amounts of diluent without loss of the synergistic effect of the cerium exchange step.

The invention claimed is:

1. In the method of preparing a thermally stable cracking catalyst comprising a matrix and a crystalline faujasite component, the improvement which includes the steps of: calcining kaolin to provide reactive kaolin which in a test of the kaolin exotherm exhibits less than 8% of the exotherm exhibited by raw kaolin, subjecting a composition featuring an alkaline aqueous mixture of such reactive kaolin to aging to produce a product having a major amount of hydrated crystalline sodium faujasite distributed through a minor amount of an amorphous residue, said amorphous residue having a greater amount of aluminaceous component than siliceous component; subjecting the sodium faujasite from such aging to prolonged exchange with an ammonium salt to provide an ammonium form composite of ammonium faujasite in said amorphous residue, said ammonium form composite containing substantially no metallic ions replaceable by ion-exchange with an aqueous solution of an ammonium salt; thereafter treating said ammonium form composite with an aqueous solution of a cerium salt to prepare a partially ammonium-exchanged faujasite, partially cerium-exchanged faujasite in a matrix the cerium exchange being from about 5% to about 33% of the ion-exchange capacity of said ammonium form composite; subjecting such exchanged composite to an elevated temperature to prepare a catalyst consisting of a matrix featuring said residue and featuring both cerium faujasite and the product from calcination of ammonium faujasite; and cooling said composite to provide a cracking catalyst.

2. The method of claim 1 in which the cracking catalyst is shaped as fluidizable cracking catalyst particles.

3. The method of claim 2 in which fluidizable particles are formed by spray drying an aqueous system comprising added sodium silicate and said sodium faujasite distributed through a lesser amount of an amorphous residue.

References Cited
UNITED STATES PATENTS

| | | | |
|---|---|---|---|
| 3,312,615 | 4/1967 | Cramer et al. | 252—455 X |
| 3,367,886 | 2/1968 | Haden et al. | 252—455 |
| 3,431,218 | 3/1969 | Plank et al. | 252—455 |

DANIEL E. WYMAN, Primary Examiner

C. F. DEES, Assistant Examiner

U.S. Cl. X.R.

23—112

PO-1050
(5/69)

UNITED STATES PATENT OFFICE
CERTIFICATE OF CORRECTION

Patent No. 3,515,683   Dated June 2, 1970

Inventor(s) William H. Flank et al

It is certified that error appears in the above-identified patent and that said Letters Patent are hereby corrected as shown below:

Column 3, line 53 - "stabilizzed" should read --stabilized--.

Column 3, line 55 - After "man-" insert --ufacturers to refiners was free from multi-valent cations--.

Column 3, line 56 - delete "calcined catalyst was stabilized by rare earth cation".

Column 8, line 38 - "077" should read --0.77--.

Column 10, line 75 (last table) - "79.4" should read --79.7--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents